United States Patent Office 3,156,717
Patented Nov. 10, 1964

3,156,717
ORGANIC SULFUR COMPOUNDS HAVING FUNGICIDAL ACTIVITY
Giorgio Rossi, Milan, Italy, assignor to Montecatini Società Generale per l'Industria Mineraria e Chimica, Milan, Italy, a corporation of Italy
No Drawing. Filed Dec. 21, 1961, Ser. No. 161,245
Claims priority, application Italy Dec. 28, 1960
4 Claims. (Cl. 260—455)

My invention relates to esters of an organic aliphatic or aromatic acid with an alkyl xanthoyl carbinol or with a dialkyl-dithiocarbamyl carbinol.

This is a continuation-in-part of U.S. application Serial No. 827,692, filed July 17, 1959, which relates to organic sulfur compounds having the formula:

$$R-\underset{\underset{S}{\|}}{C}-S-CH_2-OCOR_1 \quad (1)$$

in which R is a methoxy, ethoxy, isopropyloxy or a dimethyl amino or diethylamino group and $R_1$ is a methyl or phenyl group; and to a process for preparing these compounds, characterized in that either a metal alkyl-xanthate having the formula:

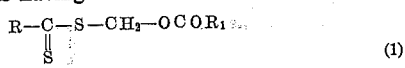

$$RO-\underset{\underset{S}{\|}}{C}-SMe \quad (2)$$

in which R is preferably methyl, ethyl or isopropyl, and Me is a metallic element (e.g. sodium or potassium); or a metal dialkyl dithiocarbamate having the formula:

$$\underset{R}{\overset{R}{\diagdown}}N-\underset{\underset{S}{\|}}{C}-SMe \quad (3)$$

in which R is methyl or ethyl and Me is sodium or potassium, is reacted with a chloromethyl ester of a carboxylic acid, such as acetic or benzoic acid, of the formula:

$$R_1-COOCH_2Cl \quad (4)$$

in which $R_1$ is methyl or phenyl. The above-mentioned copending application also relates to fungicidal compositions comprising substances of the afore-mentioned type.

I have found that compounds having the Formula 1, in which R has the aforementioned meaning and $R_1$ is a benzyl group ($-CH_2C_6H_5$), have a high fungicidal activity.

Objects of my application comprise compounds having the Formula 1 in which R has the above-mentioned meaning and $R_1$ is a benzyl group, a process for preparing them and the fungicidal compositions containing one or more of said compounds, alone or in admixture with other active and/or auxiliary substance.

The compounds of my invention are obtained by reacting chloromethylphenylacetate with a metal compound having the formula:

$$R-\underset{\underset{S}{\|}}{C}-SMe \quad (5)$$

in which R has the aforementioned meaning and Me is an alkali metal, such as sodium or potassium according to the equation:

$$R-\underset{\underset{S}{\|}}{C}-S-Me + ClCH_2-O-CO-CH_2-C_6H_5 \longrightarrow$$

$$R-\underset{\underset{S}{\|}}{C}-S-CH_2-O-COCH_2-C_6H_5 + MeCl$$

The reaction is carried out in the presence of an inert solvent capable of dissolving one or both reactants. As solvents, monohydric alcohol, ketones or their mixtures may be used. Suitable temperatures may vary within fairly wide limits, e.g. from 10° to 80° C. The duration of the reaction varies from 1 to 16 hours. It is convenient, sometimes, to use an excess of one of the two reagents over the stoichiometric amount.

The metal halide formed as a by-product of the reaction can be eliminated by filtering or by adding water. In the latter case, the inorganic salt and the excess, if any, of organic salt are dissolved, thereby resulting in the simultaneous precipitation of the desired product. The main reaction product can also be isolated by other known methods such as concentration, distillation and crystallization. The following illustrating examples are given to better illustrate the preparation of the materials, and are not meant to limit the scope of the invention.

EXAMPLE 1

18.4 g. of chloromethyl phenylacetate are added to a suspension of 15.7 g. of sodium dimethyl dithiocarbamate in 80 cc. of acetone. An exothermic reaction takes place, with precipitation of sodium chloride. The mixture is refluxed for half an hour and is then left to stand for 15 hours. The reaction mixture is then poured into 500 cc. of water; the precipitate thus formed is filtered under vacuum and washed with water. 26 g. of dimethyl dithiocarbamylcarbinol phenylacetate, having the formula

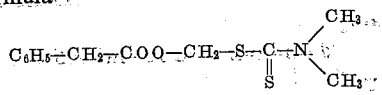

$$C_6H_5-CH_2-COO-CH_2-S-\underset{\underset{S}{\|}}{C}-N\underset{CH_3}{\overset{CH_3}{\diagdown}}$$

as a gray-white crystalline solid are obtained. The product, after crystallization from methanol, has a melting point of 90–91° C. S calculated=23.81%; S found= 23.44–23.14%.

EXAMPLE 2

18.4 g. of chloromethyl phenylacetate are added to a suspension of 19.2 g. of potassium ethylxanthate in 150 cc. of acetone; an exothermic reaction takes place, with precipitation of potassium chloride. The mixture is refluxed for half an hour and is then left to stand for 15 hours. The reaction mixture is then poured into 150 cc. of $H_2O$; the oil thus separated is treated with 70 cc. of methylene chloride and washed twice with $H_2O$ (each time 50 cc.). After drying on $CaCl_2$ and removing the solvent by reduced pressure, 21 g. of ethylxanthoylcarbinol phenylacetate, having the formula:

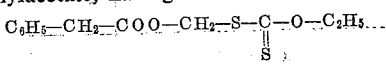

$$C_6H_5-CH_2-COO-CH_2-S-\underset{\underset{S}{\|}}{C}-O-C_2H_5$$

are obtained as a clear yellow oil having: $D_4^{20}=1.212$; $n_D^{20}=1.5665$. S calculated=23.73%; S found=22.70–22.69%.

Substitution of potassium methylxanthate or potassium isopropylxanthate for potassium ethylxanthate yields respectively corresponding methyl or isopropylxanthoyl-carbinol phenylacetate.

EXAMPLE 3

18.4 g. of chloromethylphenylacetate are added to a suspension of 24.5 g. of sodium diethyldithiocarbamate in 150 cc. of acetone; an exothermic reaction takes place, with precipitation of sodium chloride. The mixture is refluxed for half an hour and is then left to stand for 15 hours. The reaction mixture is then poured into 150 cc. of water; the oil thus separated is treated with 70 cc. of methylene chloride and washed twice with $H_2O$ (50 cc. each time). After drying on $CaCl_2$ and evaporation of the solvent under reduced pressure, 28 g. of diethyl dithiocarbamyl-carbinol phenylacetate, having the formula:

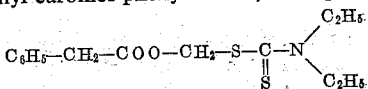

$$C_6H_5-CH_2-COO-CH_2-S-\underset{\underset{S}{\|}}{C}-N\underset{C_2H_5}{\overset{C_2H_5}{\diagdown}}$$

are obtained as a slightly turbid oil having: $D_4^{20}=1.167$;

$n_D^{20}=1.5860$. N calculated=4.71%; N found=4.71–4.69%.

Formulations containing the compounds of the instant invention to be used as fungicides can, for example, have the following compositions:

(1) 90 g. of dimethyl dithiocarbamylcarbinol phenylacetate, 6.8 g. lignin sulphite, 3 g. of expanded silica, 0.15 g. of kieselguhr, and 0.5 g. of wetting agent obtained by condensation of ethylene oxide;

(2) 50 g. of diethyl dithiocarbamylcarbinol phenylacetate, 40 g. of kieselguhr, 2 g. of expanded silica and 8 g. of lignin sulphite.

In application, the aforementioned formulations are added to water in such amounts as to reach the desired concentration. A homogeneous dispersion, ready for use (nebulization of plants) is then obtained by simple mechanical agitation.

Evaluation of the Anti-Oidial Activity

The method used for evaluating anti-oidial activity consists of nebulizing under standard conditions aqueous dispersions of the products to be tested on small tobacco plants of the "Virginia Bright" variety bred under standard conditions. When the nebulized product deposited thereon has become completely dry, the test plants are infected by slight rubbing with leaves covered with oidium (*Erysiphe cichoracearum*). The determination of the infection is carried out by estimating the percent proportion of leaf surface area covered with oidium about 15 days after treatment and by comparing it with the infection of untreated controls. The following 5 classes of degrees if intensity of infection were thus established, in increasing order of infection:

1—no infection
2—considerable reduction of infection as compared with the untreated control (10–20% against 70–90%)
3—evident reduction of infection as compared with the untreated control (30–40% against 70–90%)
4—slight reduction of infection as compared with the untreated control (50–60% against 70–90%)
5—infection as in the untreated control A sample of commercial colloidal sulfur was used as reference of comparison.

TABLE 1

| Product | Dose, percent | Intensity of infection after 15 days |
|---|---|---|
| Dimethyldithiocarbamyl carbinol phenylacetate | 0.250 | 1 |
| | 0.125 | 2 |
| | 0.050 | 4 |
| Diethyl dithiocarbamylcarbinol phenylacetate | 0.0500 | 1 |
| | 0.0250 | 1 |
| | 0.0125 | 2 |
| | 0.0062 | 3 |
| Colloidal sulfur | 0.0500 | 1 |
| | 0.0250 | 1 |
| | 0.0125 | 2 |
| | 0.0062 | 3 |

The fungicidal activity of the products according to the invention is illustrated by the following results obtained by standard laboratory methods.

(a) *Evaluation of the Capacity of the Products To Inhibit Growth and Diffusion of Fungine Mycelium, After Absorption on Filter Paper, Evaporation of the Solvent, Resolubilization and Diffusion on Nutritive Agar-Agar*

By this technique, small filter paper disks with 1 cm. diameter, impregnated with the solutions of the products under examination, are placed on the agar-agar coated surface of Petri dishes seeded with test fungi. After incubation for 72 hours, the halos of inhibition of fungine growth around those disks are determined, and expressed in mm. The known fungicide sodium pentachlorophenate was taken as a reference for comparison.

The results are classified as follows:

0—inhibition halo with diameter less than 1 mm.
1—inhibition halo with diameter less than 1–2 mm.
2—inhibiiton halo with diameter less than 3–4 mm.
3—inhibition halo with diameter less than 5–7 mm.
4—inhibition halo with diameter less than 8–11 mm.
5—inhibition halo with diameter less than 12–15 mm.
6—inhibition halo with diameter less than 16–20 mm.
7—inhibition halo with diameter less than 21–25 mm.
8—inhibition halo with diameter greater than 25 mm.

TABLE 2

| Product | Dose, percent | Alternaria tenuis | Aspergillus niger | Penicill. roquef. | Sacc. ell. |
|---|---|---|---|---|---|
| Dimethyldithiocarbamyl-carbinol phenylacetate | 1 | 4 | 4 | 2 | 2 |
| | 0.2 | 4 | 4 | 2 | 2 |
| | 0.04 | 1 | 1 | 0 | 0 |
| Ethyl xanthoylcarbinol phenylacetate | 1 | 3 | 2 | 2 | 0 |
| | 0.2 | 3 | 2 | 1 | 0 |
| | 0.04 | 0 | 0 | 0 | 1 |
| Diethyldithiocarbamyl-carbinol phenylacetate | 1 | 4 | 0 | 1 | 0 |
| | 0.2 | 3 | 0 | 1 | 0 |
| | 0.04 | 2 | 0 | 0 | 0 |
| Sodium pentachlorophenate | 1 | 7 | 6 | 7 | 5 |
| | 0.2 | 5 | 5 | 5 | 2 |
| | 0.04 | 2 | 1 | 2 | 1 |

(b) *Evaluation of the Capacity of the Products To Inhibit Growth and Diffusion of Fungine Mycelium According to the Porcelain Cup Method*

The cup method differs from the aforementioned method only in the use of a porcelain cup containing a constant dose of solution of the product to be examined, in lieu of small paper disks. Sodium pentachlorophenate was taken as a reference for comparison.

The results obtained are classified by indexes as hereinbefore defined.

TABLE 3

| Product | Dose, percent | Alternaria tenuis | Aspergillus niger | Penicill. roquef. | Sacc. ell. |
|---|---|---|---|---|---|
| Dimethyldithiocarbamyl-carbinol phenylacetate | 1 | 6 | 4 | 3 | 3 |
| | 0.2 | 6 | 4 | 1 | 2 |
| | 0.04 | 2 | 1 | 0 | 0 |
| Ethylxanthoyl carbinol-phenylacetate | 1 | 4 | 4 | 2 | 1 |
| | 0.2 | 3 | 3 | 1 | 0 |
| | 0.04 | 1 | 1 | 0 | 0 |
| Diethyldithiocarbamyl-carbinol phenylacetate | 1 | 4 | 2 | 3 | 0 |
| | 0.2 | 3 | 1 | 1 | 0 |
| | 0.04 | 2 | 0 | 0 | 0 |
| Sodium pentachlorophenate | 1 | 7 | 6 | 6 | 5 |
| | 0.2 | 6 | 5 | 5 | 2 |
| | 0.04 | 2 | 1 | 2 | 1 |

(c) *Evaluation of the Capacity to Inhibit Germination and Growth of Fungine Mycelium, of the Products Incorporated in the Nutritive Agar-Agar (Streak Method)*

The streak method allows the examination of products hardly diffusible in solid agar-agar. By this method, the solution of the products is incorporated in the nutritive substrate, while the inoculation of the test fungus is carried out by means of streaks with suspension of spores. The reading of the plates is carried out after 72 hours and the growth of the fungi is evaluated by indexes defined as follows:

0—no difference in respect of water as a control
1—slight difference in respect of water as a control
2—colonies spread over all streaks
3—some colonies on some streaks
4—no fungus growth

| Product | Dose, percent | *Alternaria tenuis* | *Aspergillus niger* | *Penicill. roquef.* | *Sacc. ell.* |
|---|---|---|---|---|---|
| Dimethyldithiocarbamylcarbinol phenylacetate | 0.2 | 4 | 3 | 1 | 0 |
| | 0.04 | 3 | 2 | 0 | 0 |
| | 0.008 | 2 | 1 | 0 | 0 |
| Ethylxanthoylcarbinolphenylacetate | 0.2 | 4 | 3 | 4 | 2 |
| | 0.04 | 4 | 3 | 3 | 1 |
| | 0.008 | 2 | 1 | 0 | 0 |
| Diethyldithiocarbamylcarbinol-phenylacetate | 0.2 | 2 | 1 | 2 | 0 |
| | 0.04 | 1 | 1 | 1 | 0 |
| | 0.008 | 1 | 0 | 0 | 0 |
| Sodium pentachlorophenate | 0.2 | 4 | 4 | 4 | 4 |
| | 0.04 | 4 | 4 | 4 | 4 |
| | 0.008 | 4 | 2 | 2 | 1 |

*(b) Evaluation of the Capacity to Inhibit Sundry Fungus Growths*

An aqueous dispersion of formulation 1 above was applied by nebulation under standard conditions on young kidney beans plants grown in part under artificial light, after drying of the fungicide film on the plants, the plants were infected with bean rust (*Uromyces appendiculatus*). A 0.1% aqueous dispersion of diethyldithiocarbamyl carbinol phenylacetate inhibited the infection, while a 0.25% aqueous dispersion of dimethyldithiocarbamyl phenylacetate reduced the same infection to 2%, as compared with that of the untreated controls.

A 0.0125% aqueous dispersion of diethyldithiocarbamyl carbinol acetate, applied by nebulation under standard conditions on grapevine leaves placed in a Petri dish, inhibited the development of downy mildew (*Plasmopara viticola*) to 5% of that of the untreated controls.

A 0.5% aqueous dispersion of the same product, nebulized under standard conditions on broad bean leaves in Petri dishes, reduced to 5%, as compared to the untreated controls, the infection of chocolate spot on broad bean (*Botrytis fabae*), which was seeded after complete drying of the product deposited on the leaves.

A 0.025% aqueous dispersion of the above product, deposited dropwise on glass slides, inhibited the germination of *Alternaria tenuis* spores.

I claim:

1. A compound having the formula:

$$R{-}\underset{\underset{\displaystyle S}{\|}}{C}{-}S{-}CH_2{-}OCOR_1$$

in which R is selected from the group consisting of methoxy, ethoxy, isopropoxy, dimethylamino and diethylamino groups, and $R_1$ is benzyl ($-CH_2C_6H_5$).

2. Dimethyldithiocarbamylcarbinol phenylacetate.
3. Ethylxanthoylcarbinol phenylacetate.
4. Diethyldithiocarbamylcarbinol phenylacetate.

References Cited in the file of this patent

UNITED STATES PATENTS

| | | |
|---|---|---|
| 2,907,786 | Gundel | Oct. 6, 1959 |
| 2,910,497 | Meuly | Oct. 27, 1959 |
| 2,943,972 | Van der Kerk | July 5, 1960 |
| 2,990,317 | Jones et al. | June 27, 1961 |